Feb. 19, 1963 R. W. ROGERS ET AL 3,077,772
FORCE MEASURING APPARATUS
Filed Sept. 23, 1960 2 Sheets-Sheet 1

INVENTORS
ROBERT W. ROGERS
JOHN V. CARDOZ
BY
Barlow & Barlow
ATTORNEYS

INVENTORS
ROBERT W. ROGERS
JOHN V. CARDOZ
BY
Barlow & Barlow
ATTORNEYS

United States Patent Office 3,077,772
Patented Feb. 19, 1963

3,077,772
FORCE MEASURING APPARATUS
Robert W. Rogers, Barrington, and John V. Cardoz, Warwick, R.I., assignors to Scott Testers, Inc., a corporation of Rhode Island
Filed Sept. 23, 1960, Ser. No. 57,954
8 Claims. (Cl. 73—141)

This invention relates to a testing apparatus in which the force applied is measured.

The invention is an improvement on devices of the type shown in Patents Nos. 2,699,063 and 2,299,064 in which devices a substantial change must be made for a change of range of the test.

One of the objects of this invention is to provide an arrangement whereby the interchange of parts necessary for changing the range of test operation may be easily and quickly accomplished.

Another object of the invention is to provide a single part which may be accessible from the exterior of the device for easy removal for interchange with a similar single part of a different testing range.

Another object of the invention is to provide a strain or testing unit which may be of such structure that it can be easily interposed in the line of stress for testing the work.

With these and other objects in view, the invention consists of certain novel features of construction as will be more fully described and particularly pointed out in the appended claims.

Figure 1:
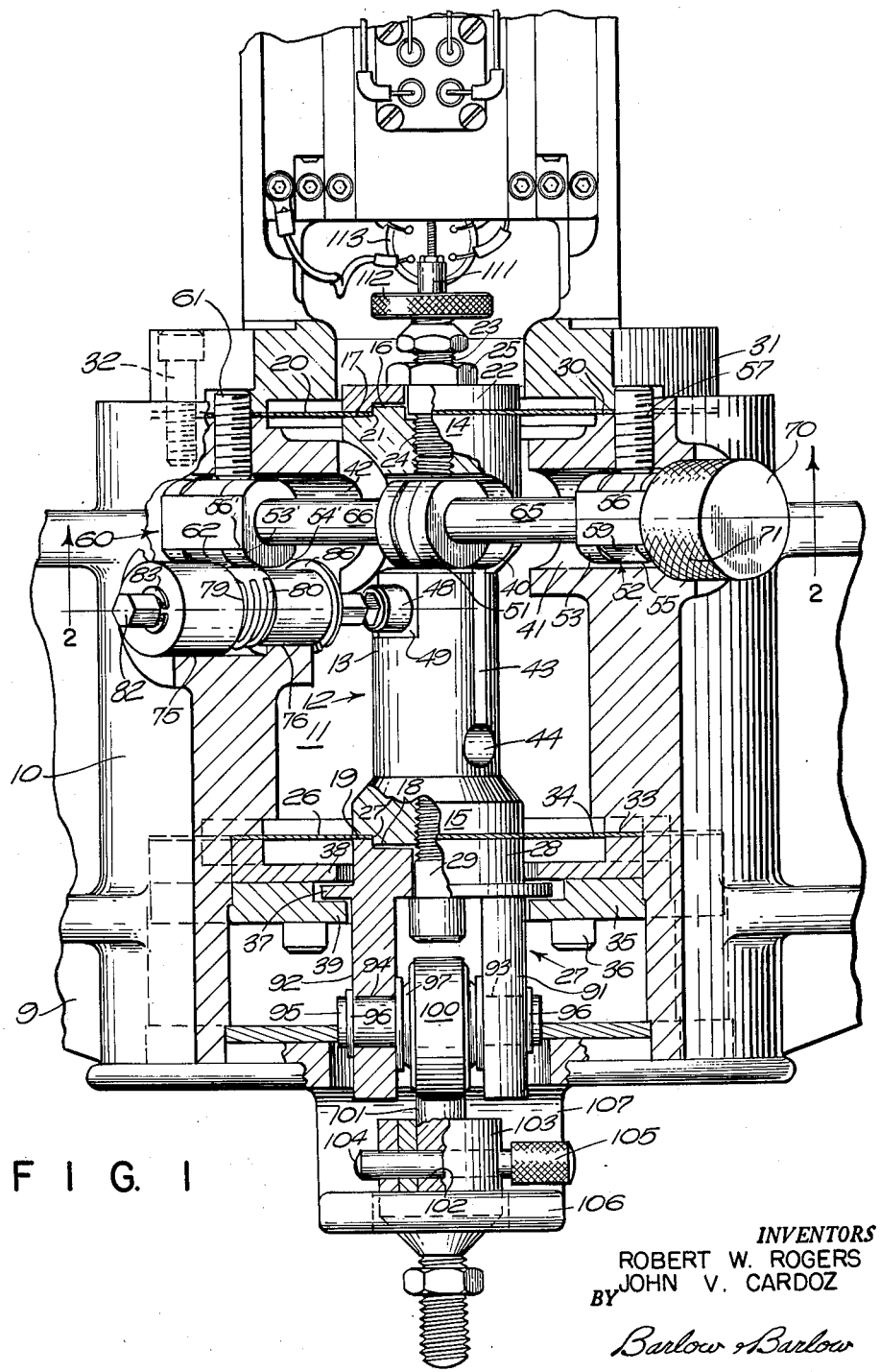
FIGURE 1 is a sectional view on line 1—1 of FIGURE 2 looking in the direction of the arrows except that it is broken away to show substantially a diametric section of the replaceable part.

This invention relates to an apparatus of the type which may have different ranges of test operation by interchange of one of the parts of the apparatus. The gauge upon which indications are read is a sensitive instrument measuring small movements. A force dividing member is interposed in the strain applied and the gauge indicates the movement of this member in accordance with the load applied. Such a member will have a certain range of operation and for wider ranges of operation we substitute different force dividing members, each operable over different ranges of load applied, to bring the movement of each member within the range which the gauge will accommodate. In order to make the apparatus readily applicable to various ranges we have provided a force divider which may be easily interchanged with other force dividers and which is so located as to be readily accessible from the exterior of the apparatus so that by a simple operation and in a matter of less than two minutes the range of the machine may be changed from one range to another by substituting one force divider for another.

In the illustration which accompanies this specification there is a support 9 carrying a cylindrical housing 10 within which the force divider is located together with the mechanism with which it is associated. The housing may be a casting of substantial thickness which is bored to provide suitable mountings of parts which are to be supplied. The housing has a generally hollow center 11 within which there is located an armature 12 which comprises a center body portion 13 with enlarged heads 14 and 15 at either end. This armature has its heads reduced to provide a small projecting end 16 beyond the head 14 providing a shoulder 17 while at the other end there is a small projecting portion 18 beyond the head 15 providing the shoulder 19.

A flexible diaphragm plate 20 has a central opening 21 of a size to receive the projecting portion 16 while the margin about this central opening 21 rests upon the shoulder 17. This plate is secured to the head 14 of the armature by a cap 22 recessed to receive the projection 16 and by means of a stud 23 which is threaded into the tap hole 24 in the armature head 14 and upon which there is screwed a nut 25 against the cap 22. Stud 23 projects out beyond the nut for purposes as will later be explained.

A second flexible diaphragm plate similar to plate 20 is designated 26 and has an opening 27' to receive the projection 18 and rests upon shoulder 19. A stirrup member 27 has a head 28 with a recess to receive the projection 18 and engages the flexible plate 26 to press it against the shoulder 19. A cap screw 29 is threaded into the head 15 so as to secure the stirrup member 27 in position to bind the flexible diaphragm plate 26 to the head 15.

The diaphragm 20 rests upon the shoulder 30 formed by a recess in the end of the housing 10 and is bound in this position by the base of the gauge assembly 31 which engages the periphery of the plate 20 and is secured by means of cap screws 32 entering the housing 10.

The diaphragm plate 26 engages a shoulder 33 of the housing and is bound thereto by the annular rings 34, 35 and cap screws 36. The length of the armature between shoulders 17 and 19 is substantially the same distance as between the shoulders 30 and 33 and thus the armature is held mounted in the casing in a manner so that it may move axially a distance within the flexibility of the diaphragm plates 20 and 26. In order that the armature will not move beyond the elastic limits of the diaphragm plates 20 and 26, a flange 37 is provided on the stirrup member 27 which will engage the annual projection 38 from the ring 34 to limit the upward movement of the armature while an annual projection 39 is provided on the ring 35 below the flange 37 so as to limit the downward movement of the armature. This stirrup member 27 has depending legs 91 and 92 through which the pull is applied as will be hereinafter explained.

The armature 12 is provided with a diametric bore 40 for the reception of the force divider. This bore 40 is in line with bore 41 on one side and bore 42 on the other side of the casing, each of which is larger than the size of the bore 40 the arrangement being such that all three bores 40, 41 and 42 are substantially in axial alignment. A slot 43 is provided in the armature extending radially away from the axis of bore 40 and passing completely diametrically through the armature body 13 terminating in a constructional bore 44 at a point sufficiently distant from the bore 40 so that the parts of the body 13 on either side of the slot 43 may be drawn toward each other to contract the bore 40.

Figure 2:
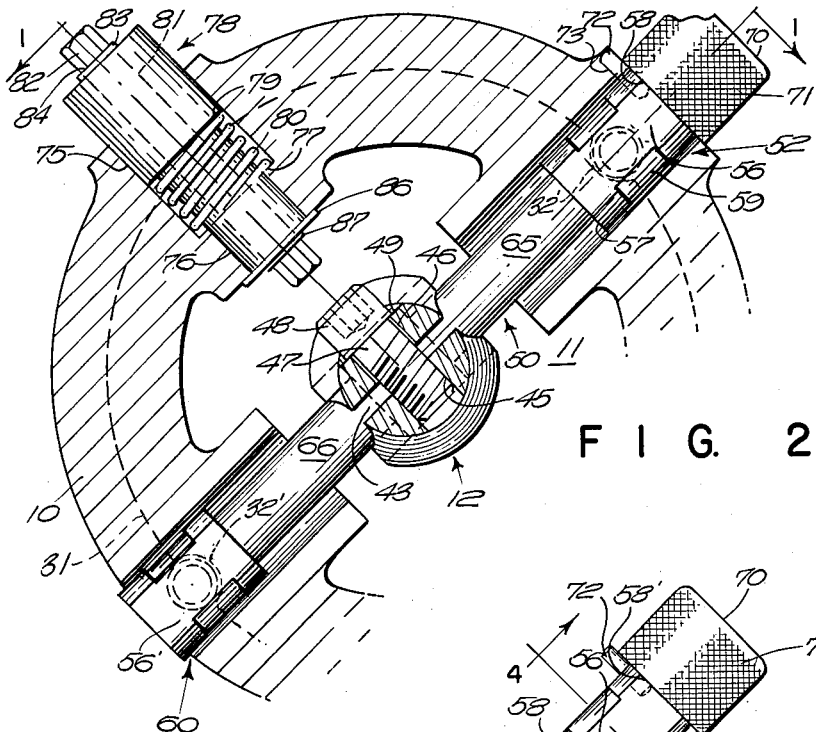
FIGURE 2 is a sectional view on the staggered line 2—2 of FIGURE 1.

For such contraction there is a tapped opening 45 (see FIGURE 2) on one side of the slot 43 while a smooth bore opening 46 is on the other side of the slot 43 of a sufficient size to be free of the threads of a screw 47 having a head 48 the under shoulder of which will engage the flat surface 49 about bore 46 as it is threaded into the threads 45. This head 48 has a recess of hexagonal shape to be engaged by an Allen type wrench. Upon turning up this screw 47 the edges of the slot will be drawn toward each other and the bore 40 will be contracted.

Figure 3:
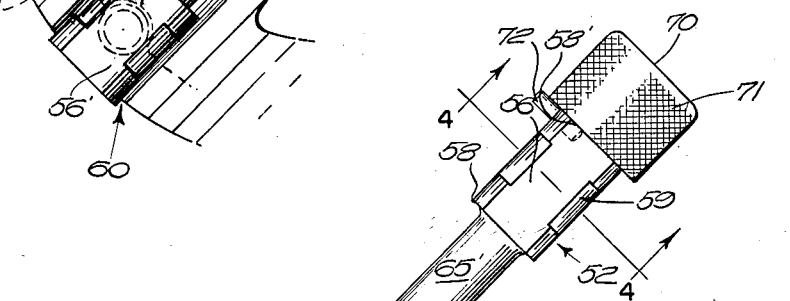
FIGURE 3 is a plan view of the force divider unit.
Figure 4:
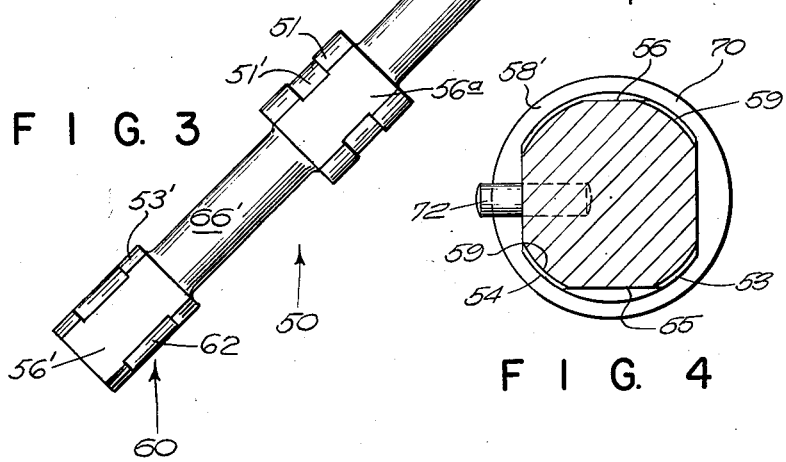
FIGURE 4 is a sectional view on line 4—4 of FIGURE 3.

The force divider designated generally 50 (see also FIGURE 3) is generally of rod-like form with the center portion 51 of a size to enter the bore 40 in the head 14 of the armature freely when the bore 40 inherently expands to its largest size but this portion 51 is of such a size that when the bore 40 is contracted the walls of the bore will bind firmly upon this center portion 51 of the force divider. The end portion 52 of this force divider is received in the bore 41 of the casing or housing and is generally cylindrical but flattened on four equally spaced surfaces so as to leave rounded portions 53 and 54 (FIGURE 4) on either side of the bottom of flat surface 55 which will engage the larger bore 41 in the casing while a surface 56 diametrically opposite the lower surface 55 provides a flat surface against which a set screw 57 (FIGURE 1) may engage so as to provide a three-point rigid mounting for the end portion 52 of the force divider in the bore 41. The end portion 52 between its ends 58 and 58' is recessed as at 59 so that the bearing points 53 and 54 will be only at spaced lines rather than at the full length of a line extending between the ends 58 and 58'. The other end portion 60 of the force divider is shaped similarly to the portion 52, that is, it is generally cylindrical with four equally spaced opposite flattened portions so as to provide cylindrical bearing portions 53' and 54' to engage the surface of the bore 42 while the set screw 61 engages the upper flat surface 56' of the portion 60 and provides a three-point support for holding the force divider in position. This portion 60 of the force divider is also recessed at 62 between its ends so as to provide spaced lines for its support in the bearing 42.

The center portion 51 is flattened at its top as at 56a similar to surfaces 56, 56' so that it will clear set screw 57 when the force divider is removed from position. This center portion is grooved as at 51' so that it will be gripped at spaced locations in the armature. The portions 65 and 66 between the center portion 51 and the end portions 52 and 60 are of different cross sections depending upon the amount of stress which it is desired shall take place to cause deflection. This force divider may be furnished for different ranges, for instance from one to 10 pounds, another range to 50 pounds, another to 100 pounds, and so forth, all depending upon the length and diameter provided by these portions 65 and 66 and the particular material and characteristics of material which are utilized in this force divider. Thus the diameter of the portions 65 and 66 in FIGURE 1 is smaller than the diameter 65', 66' in FIGURE 3, each appropriate for a different range of testing but both capable of insertion in bores 40, 41 and 42. A handle 70 is provided on the end of the force divider which is of a cylindrical size larger than the bore 41 so that the inner end of this handle may engage and provide an abutment for limiting the insertion of the force divider into the casing or housing and for convenience the cylindrical surface of this handle may be knurled as at 71. A pin 72 extends radially from the portion 52 of the force divider in close adjacency to the handle 70 and will locate in a slot 73 (FIGURE 2) so that the flat surface 56 of the force divider will be brought uppermost when the force divider is in place.

In order to turn the contracting screw 47 to clamp the armature on the force divider, there is provided a two-step bore 75, 76 through the casing providing a shoulder 77 between them in which bore there is mounted a member 78 having two diameters providing a shoulder 79 between them. A spring 80 acts between the shoulder 77 of the bores and the shoulder 79 between the two sizes of the member 78 urging this member outwardly. A central bore 81 extends axially through member 78. A hexagonal pin 82 extends through the central bore 81 of the member 78 and projects beyond the ends thereof and is locked therein against sliding movement inwardly by a lock washer 83 in a recess 84 in this hexagonal pin while a washer 86 engages a groove 87 in this pin and holds it against outward movement through the member 78. This washer 86 is of such a size as to extend radially beyond the end of the member 78 and also prevent the member 78 from being moved outwardly of the casing by its engagement with the end of the bore 76. This hexagonal key is in axial alignment with the hexagonal recess in the end of the screw 48 so that when the pin 82 is engaged from without the casing and the member 78 pushed inwardly, it may serve to enter the recess and rotate the screw 48 and contract or permit expansion of the bore 40 in the armature to grip or release the force divider 50.

It will be apparent that for changing the force divider 50, it is merely necessary to loosen screw 48 by external manual manipulation through the member 78 and then by loosening screws 57 and 61, which are accessible from outside of the assembly 31 (see notches 32' for screws 32, FIGURE 2) the force divider may be removed from the casing and one of different capacity inserted in place thereof.

In order to apply a strain on the armature, the stirrup member 27 which incorporates the head 28 and the flange 37 is provided with legs 91 and 92 which have aligned openings 93 and 94 in the legs. A pin 95 extends through these aligned openings 93 and 94 and is held in place by lock washers 96 which engage grooves in the pin. Upon this pin there is mounted a portion of a sphere 97 which is encircled by a strap 100 having a neck portion 101 and an opening 102 therein, about which a collar 103 may be placed, also having openings for the reception of a pin 104 having a handle 105. Thus there is rockably mounted on a spherical surface on these legs 91 and 92 a means of attachment for a clamp for securing the work in position. A ring 106 is mounted on a bracket 107 which extends downwardly from the lower end of the casing which surrounds this collar 103 so as to limit its rocking movement to a certain extent with relation to the assembly. This collar 103 which is attached to a clamp may remain as a part of the clamp so that for changing clamps it is merely necessary to remove the pin 104 and drop the clamp from the neck 101.

The gauge assembly 31 has a base which seats in a recess in the upper end of the casing 10. A coupling stud enters a releasable clutch or socket 111 which may be actuated by thumb nut 112 to couple these two parts together. This particular type of gauge does not enter into this invention and suffice it to say strain exerted upon the neck 101 will be transmitted through the armature to this coupling stud 111 of the gauge which in turn will move the gauge by microscopic amounts which gauge will in turn amplify this movement for transmission to the indicating or recording device through conduit 113.

We claim:

1. In a device for measuring force comprising a support, a housing mounted on said support and having an opening in a wall thereof, an armature, spaced means on either side of said opening movably mounting said armature within said housing, indicating means connected to one side of said armature to respond to the movement of said armature, and stress applying means connected to the other side of said armature to move the same in said housing, a rod-like force divider independent of said mounting means in said opening and located between said armature mounting means and extending laterally of the direction of stress from the outer surface of said housing to the interior thereof, said divider being yieldable to flex under the stress applied and permit movement of the armature so that the amount of movement is reflected by said indicating means, and means to releasably secure said divider to said armature whereby said divider may be replaced by dividers of different yieldable values for different ranges of operation.

2. A device as in claim 1 wherein said armature is mounted in said housing by flexible plates permitting axial movement thereof.

3. A device as in claim 1 wherein said armature is mounted in said housing by flexible plates permitting axial movement thereof and means to limit the axial movement in both directions.

4. A device as in claim 1, wherein said armature and housing have aligned openings therethrough, a force divider in said openings, means to clamp the divider in the housing and means to clamp the divider in the armature.

5. A device as in claim 1, wherein said armature and housing have aligned openings therethrough, a force divider in said openings, means to clamp the divider in the housing and means to clamp the divider in the armature, both of said means being accessible for manual operation from outside said housing.

6. A device as in claim 1 wherein said means to secure said divider to said armature comprises a bore through said armature, a slot extending from the bore and means to draw the opposite sides of the slot toward each other to reduce the size of the bore and clamp it on said force divider.

7. A device as in claim 1 wherein said means to secure said divider to said armature comprises a bore through said armature, a slot extending from the bore and means to draw the opposite sides of the slot toward each other to reduce the size of the bore and clamp it on said force divider and means to secure said force divider to said housing comprising an opening therein in which said divider is located and a set screw threaded in said housing to force the divider against a wall of said opening.

8. In a device for measuring force comprising a support, a housing mounted on said support, an armature movably mounted within said housing, indicating means connected to one side of said armature to respond to the movement of said armature, and stress applying means connected to the other side of said armature to move the same in said housing, a force divider extending laterally of the direction of stress from the outer surface of said housing to the interior thereof, said divider being yieldable to flex under the stress applied and permit movement of the armature so that the amount of movement is reflected by said indicating means, means to secure said divider to said armature comprising a bore through said armature, a slot extending from the bore and means to draw the opposite sides of the slot toward each other to reduce the size of the bore and clamp it to said force divider and a retractable plug mounted for axial movement on said housing for actuating the last said means.

References Cited in the file of this patent

UNITED STATES PATENTS

| | | |
|---|---|---|
| 1,846,326 | Flint | Feb. 23, 1932 |
| 2,314,178 | Tate | Mar. 16, 1943 |
| 2,699,063 | Rogers | Jan. 11, 1955 |
| 2,934,092 | Saunders | Apr. 26, 1960 |
| 2,988,673 | Harkins | June 13, 1961 |